US008214754B2

(12) United States Patent
Zoller et al.

(10) Patent No.: US 8,214,754 B2
(45) Date of Patent: Jul. 3, 2012

(54) REGISTRATION OF APPLICATIONS AND COMPLIMENTARY FEATURES FOR INTERACTIVE USER INTERFACES

(75) Inventors: David Ethan Zoller, Seattle, WA (US); David R. Fulmer, Redmond, WA (US); Dean W Talley, Issaquah, WA (US); Hugh C. Vidos, Sammamish, WA (US); Michael E. Creasy, Redmond, WA (US); John Elsbree, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 500 days.

(21) Appl. No.: 11/108,067

(22) Filed: Apr. 15, 2005

(65) Prior Publication Data
US 2006/0236337 A1 Oct. 19, 2006

(51) Int. Cl.
*G06F 3/00* (2006.01)
*G06F 3/048* (2006.01)

(52) U.S. Cl. ........ 715/764; 715/700; 715/716; 715/767; 715/781

(58) Field of Classification Search .................. 715/767, 715/234, 700, 716, 717, 719, 720, 760, 762, 715/764, 781
See application file for complete search history.

(56) References Cited

U.S. PATENT DOCUMENTS

| | | | |
|---|---|---|---|
| 5,809,497 A | 9/1998 | Freund et al. | |
| 6,008,807 A | 12/1999 | Bretschneider et al. | |
| 6,084,582 A | 7/2000 | Qureshi et al. | |
| 6,342,907 B1 | 1/2002 | Petty et al. | |
| 6,366,914 B1 | 4/2002 | Stern | |
| 6,401,134 B1 | 6/2002 | Razavi et al. | |
| 6,446,109 B2 | 9/2002 | Gupta | |
| 6,452,609 B1 | 9/2002 | Katinsky et al. | |
| 6,460,058 B2 * | 10/2002 | Koppolu et al. | 715/738 |
| 6,714,219 B2 | 3/2004 | Lindhorst et al. | |
| 6,731,312 B2 | 5/2004 | Robbin | |
| 7,036,083 B1 | 4/2006 | Zenith | |
| 7,152,094 B1 | 12/2006 | Jannu et al. | |
| 7,155,681 B2 | 12/2006 | Mansour et al. | |
| 7,203,678 B1 | 4/2007 | Petropoulos et al. | |
| 7,225,130 B2 | 5/2007 | Roth et al. | |
| 7,246,134 B1 | 7/2007 | Kitain et al. | |
| 7,246,326 B2 | 7/2007 | Haley | |
| 7,283,121 B2 | 10/2007 | Adan et al. | |

(Continued)

FOREIGN PATENT DOCUMENTS

EP 1376331 1/2004

(Continued)

OTHER PUBLICATIONS

Kovsky, Steve, Absolute Beginner's Guide to Microsoft Windows® XP Media Center®, Feb. 10, 2004, Que, 8 pages.*

(Continued)

*Primary Examiner* — Tadeese Hailu
*Assistant Examiner* — Yongjia Pan
(74) *Attorney, Agent, or Firm* — Lee & Hayes, PLLC

(57) ABSTRACT

An exemplary computer-implementable method includes receiving a call from an application executing on a host computer, the host computer having a collection of graphical user interfaces, and, in response to the call, registering the application whereby the registering comprises providing one or more entry points for the application wherein each entry point corresponds to at least one of the graphical user interfaces of the collection of graphical user interfaces. Various other exemplary methods, devices, systems, etc., are also disclosed.

17 Claims, 6 Drawing Sheets

U.S. PATENT DOCUMENTS

| | | | |
|---|---|---|---|
| 7,464,332 | B2 | 12/2008 | Carter, II |
| 2001/0030661 | A1 | 10/2001 | Reichardt |
| 2001/0039594 | A1 | 11/2001 | Park et al. |
| 2001/0044798 | A1 | 11/2001 | Nagral et al. |
| 2002/0015042 | A1 | 2/2002 | Robotham et al. |
| 2002/0035731 | A1 | 3/2002 | Plotnick et al. |
| 2002/0078467 | A1 | 6/2002 | Rosin et al. |
| 2002/0085020 | A1 | 7/2002 | Carroll, Jr. |
| 2002/0105546 | A1 | 8/2002 | Kuntz |
| 2002/0130904 | A1 | 9/2002 | Becker et al. |
| 2002/0180803 | A1 | 12/2002 | Kaplan et al. |
| 2002/0196268 | A1 | 12/2002 | Wolff et al. |
| 2002/0199190 | A1 | 12/2002 | Su |
| 2003/0001893 | A1 | 1/2003 | Haley |
| 2003/0061279 | A1* | 3/2003 | Llewellyn et al. ............ 709/203 |
| 2003/0078972 | A1 | 4/2003 | Tapissier et al. |
| 2003/0079038 | A1 | 4/2003 | Robbin et al. |
| 2003/0101450 | A1 | 5/2003 | Davidsson et al. |
| 2003/0167318 | A1 | 9/2003 | Robbin et al. |
| 2003/0184585 | A1 | 10/2003 | Lin et al. |
| 2003/0204536 | A1 | 10/2003 | Keskar et al. |
| 2003/0220867 | A1 | 11/2003 | Goodwin et al. |
| 2003/0234804 | A1 | 12/2003 | Parker et al. |
| 2004/0002932 | A1 | 1/2004 | Horvitz et al. |
| 2004/0031058 | A1 | 2/2004 | Reisman |
| 2004/0044725 | A1 | 3/2004 | Bell et al. |
| 2004/0054740 | A1 | 3/2004 | Daigle et al. |
| 2004/0070628 | A1 | 4/2004 | Iten et al. |
| 2004/0130550 | A1 | 7/2004 | Blanco et al. |
| 2004/0133848 | A1* | 7/2004 | Hunt et al. ................... 715/500 |
| 2004/0141013 | A1* | 7/2004 | Alcazar et al. ................ 345/847 |
| 2004/0165006 | A1 | 8/2004 | Kirby et al. |
| 2004/0187139 | A1 | 9/2004 | D'Aurelio et al. |
| 2004/0189695 | A1 | 9/2004 | Kurtz et al. |
| 2005/0010871 | A1* | 1/2005 | Ruthfield et al. ............ 715/712 |
| 2005/0066207 | A1 | 3/2005 | Fleck et al. |
| 2005/0071757 | A1 | 3/2005 | Ehrich et al. |
| 2005/0081155 | A1* | 4/2005 | Martin et al. ................ 715/719 |
| 2005/0091107 | A1 | 4/2005 | Blum |
| 2005/0125734 | A1 | 6/2005 | Mohammed et al. |
| 2005/0132401 | A1 | 6/2005 | Boccon-Gibod et al. |
| 2005/0149872 | A1 | 7/2005 | Fong et al. |
| 2005/0262542 | A1 | 11/2005 | DeWeese et al. |
| 2006/0168340 | A1 | 7/2006 | Heller et al. |
| 2006/0168541 | A1 | 7/2006 | Hill et al. |
| 2006/0200751 | A1 | 9/2006 | Underwood et al. |
| 2006/0224575 | A1* | 10/2006 | Ostojic ............................ 707/4 |
| 2006/0225037 | A1* | 10/2006 | Glein et al. ................... 717/117 |
| 2007/0220580 | A1 | 9/2007 | Putterman et al. |
| 2008/0163078 | A1 | 7/2008 | Van Der Sanden et al. |

FOREIGN PATENT DOCUMENTS

| | | | |
|---|---|---|---|
| JP | 2003006084 | A | 1/2003 |
| JP | 2003037789 | A | 2/2003 |
| JP | 2003122587 | A | 4/2003 |
| JP | 2004062783 | A | 2/2004 |
| JP | 2004070651 | A | 3/2004 |
| JP | 2005039517 | A | 2/2005 |
| JP | 2005149605 | A | 6/2005 |

OTHER PUBLICATIONS

How to use RegisterMCEApp?, Nov. 28, 2004, http://thegreenbutton.com/forums/thread/19639.aspx.*

Windows Media Center 2005 SDK, Aug. 13, 2004, MSDN.*

Registering an Application Under the Start Menu Category, Feb. 21, 2005, http://web.archive.org/web/20050221063120/http://msdn.microsoft.com/library/en-us/MedctrSDK/htm/registeringanapplicationunderthestartmenucategory.asp.*

Michael Creasy, How to Build an Add-In for Windows Media Center Edition 2005, Oct. 12, 2004, 5 pages.*

Microsoft® Windows® XP Media Center Edition 2005 Reviewers Guide, Oct. 2004, 95 pages.*

Michael Earls, Building .NET Add-Ins for Windows Media Center Edition, Jun. 5, 2005, 7 pages.*

Michael Earls, An Introduction to Developing Software for Microsoft Windows XP Media Center Edition 2005, Mar. 8, 2005, 7 pages.*

Michael Creasy, Installing applications on Media Center , Feb. 17, 2005, 5 pages.*

Registering an Add-in with Media Center, 2005, 2 pages.*

Category Element, Aug. 13, 2004, 2 pages.*

Windows XP Media Center Edition SDK, Oct. 11, 2004, 20 pages.*

"A Method of Communicating with a Backend Server From a Dialog System", IBM, Nov. 2001, pp. 3.

"Configuring Emails—Netscape", retrieved on Sep. 12, 2007, at <<http://web.archive.org/web/2002086210940/http://support.rdsindia.com/email/netscape/step1.htm>>, RDSIndia.com, pp. 2.

European Search Report for European Patent Application No. 06111606, mailed on Aug. 23, 2006, 7 pages.

"Part 15.1: Wireless Medium Access Control (MAC) and Physical Layer (PHY) Specifications for Wireless Personal Area Networks (WPANs)", IEEE, 2002, pp. 1-4.

"Microsoft Windows XP Professional Service Pack 2.", Version 2002.

Ogletree et al., "Microsoft Windows XP Unleashed"., Sams, Dec. 11, 2001.

"ATI Remote Wonder", retrieved on Jul. 31, 2009 at <<http://web.archive.org/web/20030204012742/http://www.tweaknews.net/reviews/atiremote>>, TweakNews.net, Feb. 4, 2003, 3 pgs.

"ATI's Remote Wonder", retrieved on Jul. 31, 2009 at <<http://web.archive.org/web/20030202040919/www.ati.com/designpartners/media/pc/remot...>>, Feb. 2, 2003, 2 pgs.

"Showshifter Features, Digital Video Recorder", retrieved on Jul. 31, 2009 at <<http://web.archive.org/web/20030202085919/http://www.showshifter.com/features/dvr.htm>>, 2003, 2 pgs.

"Showshifter Support, Infrared Receivers and Remotes", retrieved on Jul. 31, 2009 at <<http://web.archive.org/ web/20021216062102/www.showshifter.com/support/ircompat.htm>>, 2002, 2 pgs.

"Showshifter Support, Media Center System Requirements", retrieved on Jul. 31, 2009 at <<http://web.archive.org/web/20021201101916/www.showshifter.com/support/system.htm>>, 2002, 3 pgs.

Creasy, M., "MedicaCenter.IsApplicationActive Isn't Implemented", Internet Article, Dec. 3, 2004, pp. 1-2, retriveved at <<http://blogs.msdn.com/mcreasy/archive/2004/12/031274660.aspx>> on Nov. 6, 2009.

Shree et al, "disable customview port focussing," retrieved at <<http://www.ureader.com/msg/148824.aspx>> on Nov. 6, 2009, published Mar. 28, 2005.

Thurrott, Paul, "Windows XP Media Center Edition 2005 Review", Oct. 14, 2004, pp. 1-11, retrieved at <<http://www.winsupersite.com/reviews/windowsxp_mce2005.asp>> on Feb. 21, 2006.

"Windows XP Media Center Edition SDK—Registering an Add-in with Media Center", MSDN Library, online, Feb. 10, 2005, pp. 1-2, retrieved at <<<http://www.web.archive.org/web/20050210032634/msdn.microsoft.com/library/en-us/medctrsdk/htm/registeringandaddinwithmediacenter.asp>> on Nov. 6, 2009.

European Search Report for EP Application No. 06749936.8, mailed Nov. 18, 2009, 11 pgs.

European Examiner's Report for EP Application No. 06749936.8, mailed Apr. 26, 2010, 7 pgs.

Translated Chinese Office Action mailed Apr. 13, 2011 for Chinese Patent Application No. 200680017359.3, a counterpart foreign application of U.S. Appl. No. 11/108,067.

The Japanese Office Action mailed Mar. 11, 2011 for Japanese Patent Application No. 2006-089445, a counterpart foreign application of US Patent No. 7,667,704.

The Japanese Notice of Rejection mailed Aug. 1, 2011 for Japanese Patent Application No. 2006-089445, a counterpart foreign application of U.S. Appl. No. 7,667,704.

The European Office Action mailed Nov. 16, 2011 for European Patent Application No. 06749936.8 a counterpart foreign application of U.S. Appl. No. 11/108067, 6 pages.

The Chinese Office Action mailed Jan. 12, 2012 for Chinese Patent Application No. 200610071421.9, a counterpart foreign application of U.S. Appl. No. 7,667,704, 6 pages.

The Chinese Office Action mailed Nov. 30, 2011 for Chinese Patent Application No. 200610071421.9, a counterpart Foreign application of U.S. Appl. No. 7,667,704, 7 pages.

Japanese Notice of Rejection mailed Nov. 18, 2011 for Japanese Patent Application No. 2008-506652, a counterpart foreign application of U.S. Appl. No. 11/108,067, 6 pages.

"Absolute Beginner's Guide to Windows XP Media Center", Feb. 2004, p. 223 (4 pgs).

"capabilities Required Element", Windows Media Center SDK, Retrieved on Jan. 31, 2012 from <<http://msdn.microsoft.com/en-us/library/windows/desktop/aa468316.aspx>>, undated, 2 pages.

"window.external.MediaCenter.RegisterApplication", Ureader.com, Jul. 2005, 6 pages.

"Windows XP Medica Center Edition 2005", Michael Creasy's Blog, Oct. 2004, 2 pages.

The Result of Consultation faxed on Jan. 31, 2012 for European Application No. 06749936.8, a counterpart foreign application of U.S. Appl. No. 11/108,067, 3 pages.

* cited by examiner

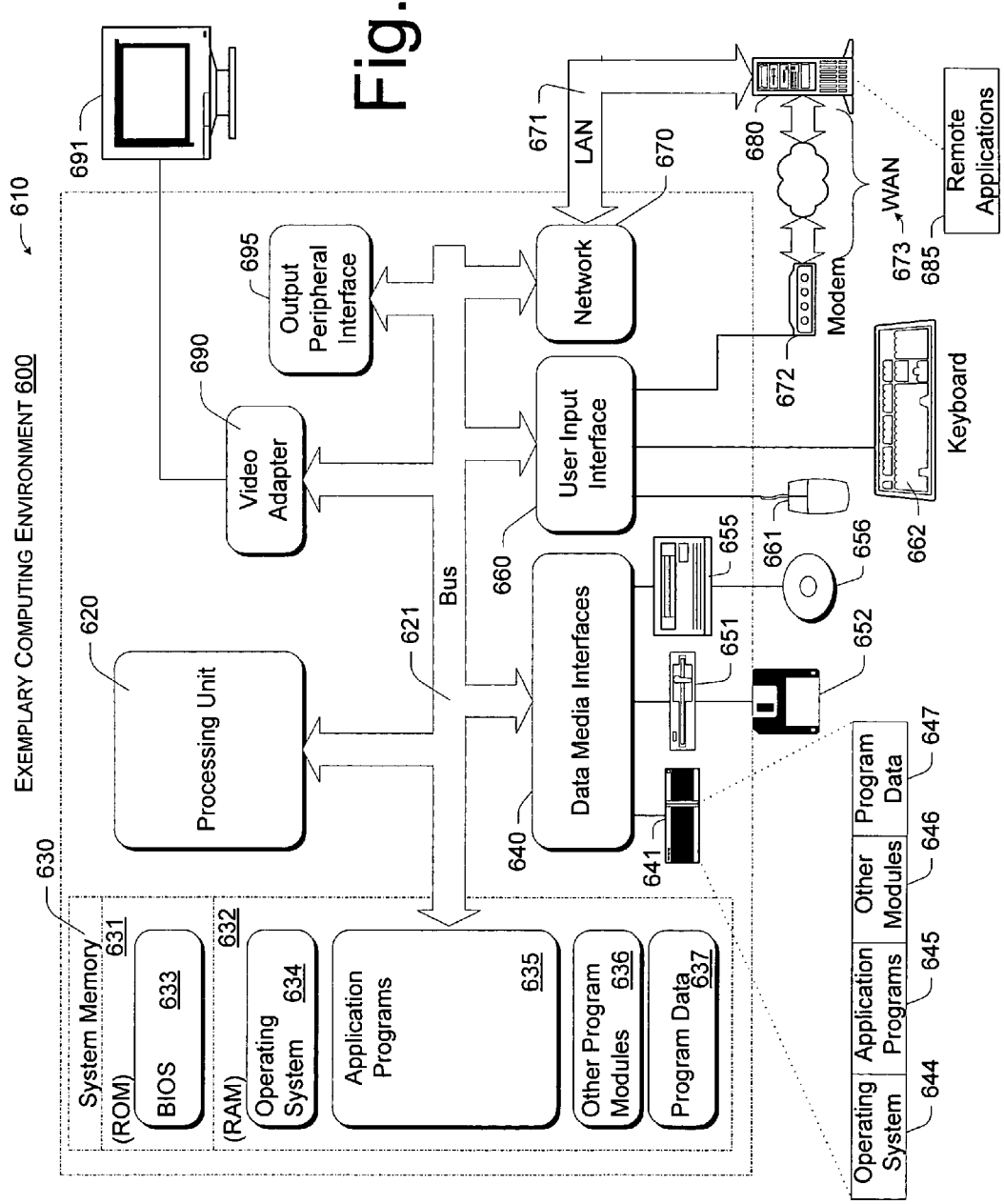

REGISTRATION OF APPLICATIONS AND COMPLIMENTARY FEATURES FOR INTERACTIVE USER INTERFACES

TECHNICAL FIELD

Subject matter disclosed herein relates generally to technology for registering applications and complimentary features for such applications.

BACKGROUND

Recent technological innovations are turning the home computer into a multimedia center. For example, the WINDOWS® XP® MEDIA CENTER EDITION 2005™ platform or operating system (Microsoft Corporation, Redmond, Wash.) enables users to enjoy entertainment, personal productivity, and creativity on a personal computer in an easy, complete, and connected way. This operating system includes features that allow a user to store, share, and enjoy photos, music, video, and recorded TV via a personal computer. In essence, such features create a so-called media center personal computer (PC). Media center PCs represent the evolution of PCs into digital media hubs that bring together entertainment choices. A media center PC with the WINDOWS® XP® MEDIA CENTER EDITION 2005™ operating system can even be accessed or controlled using a single remote control.

With respect to use of a remote control for input, the user experience differs in many ways when compared to the user experience associated with input via a keyboard and a mouse. Thus, a user interface and associated input methods typically associated with a 2' context may not provide the user with a good experience when implemented in a "10' context", i.e., where input is via a remote control. Indeed, use of a UI and associated methods developed for a 2' context, when used in a 10' context, may deter use.

In general, a user's visual experience in the 10' context is in many ways more critical than in the 2' context. The 2' context is more akin to reading a book (i.e., "normal" text and image presentation) and being able to point at the text or images with your finger while the 10' context is more akin to watching TV, where a remote control is aimed at a device, where viewing habits for users are quite varied and where viewers are more accustomed to viewing images, single words or short phrases, as opposed to lines of text. Without a doubt, the advent of the 10' context has raised new issues in the development of user interfaces and applications for use in such a context.

As described herein, various exemplary methods, devices, systems, etc., aim to improve a user's experience outside of the 2' context or in instances where a user must navigate a plurality of graphical user interfaces. Various exemplary methods, devices, systems, etc., pertain to establishing or managing relationships between applications and host system where the host system may be suited for use in the 10' context.

SUMMARY

An exemplary computer-implementable method includes receiving a call from an application executing on a host computer, the host computer having a collection of graphical user interfaces, and, in response to the call, registering the application whereby the registering comprises providing one or more entry points for the application wherein each entry point corresponds to at least one of the graphical user interfaces of the collection of graphical user interfaces. Various other exemplary methods, devices, systems, etc., are also disclosed.

BRIEF DESCRIPTION OF THE DRAWINGS

Non-limiting and non-exhaustive examples are described with reference to the following figures, wherein like reference numerals generally refer to like parts throughout the various views unless otherwise specified.

FIG. 6 is a diagram of an exemplary computing environment, which may be used to implement various exemplary technologies described herein.

DETAILED DESCRIPTION

In the description that follows, various exemplary methods, devices, systems, etc., are presented. These examples pertain generally to registration of applications and complimentary features for such applications. In various examples, an application is registered with a host. Various features related to registration or complimentary features may provide security such as restricting the application from obtaining information about the host or a user of the host. Such security features may apply to an application that communicates with the host via a network. Exemplary technology presented herein is particularly useful for applications that rely on user interfaces for the 10' context; however, such exemplary technology may be used for other contexts.

Figure 1:
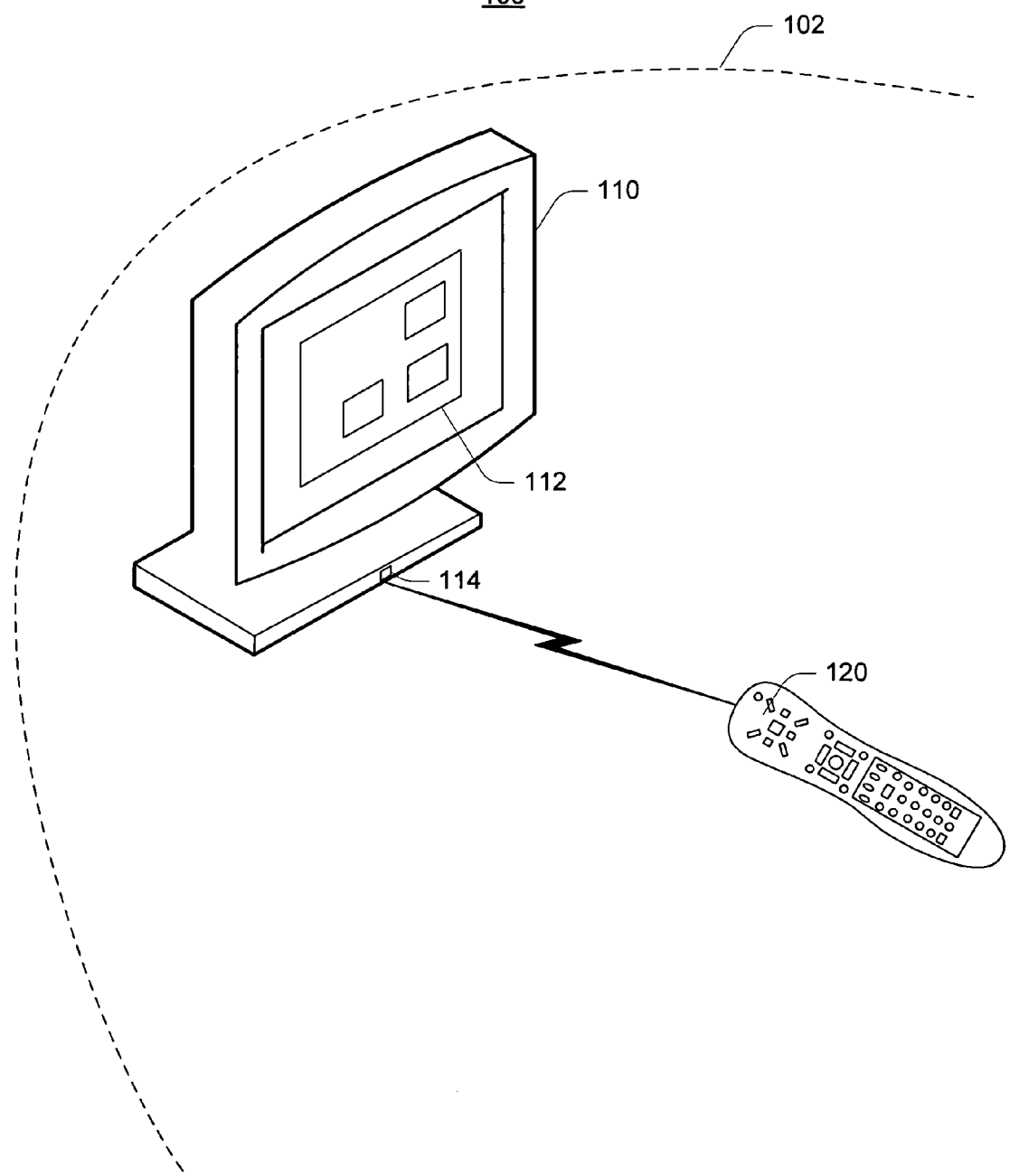
FIG. 1 is a diagram of an exemplary context that includes a display to display a user interface and a remote control for input and interaction with the user interface.

FIG. 1 shows an exemplary context 100 that has a context boundary 102 (e.g., 10' or other distance). The context boundary 102 is typically defined by a distance or distances between a user and a user interface (UI). The exemplary context 100 is akin to a distance typically found in viewing TV. In the exemplary context 100, a display 110 displays a UI 112 and a remote control 120 communicates with a controller for the display via a communication port 114, which is typically a wireless communication port (e.g., infrared, etc.). The controller for the display 110 may be a computer located proximate to the display 110 or located remote from the display 110. Various communication techniques exist to allow a computer to provide display information to create a UI.

A user interface that works well at a distance of about ten feet should account for the fact that a typical remote control (e.g., the remote control 120) is smaller and easier to use than a conventional keyboard and mouse; however, it generally provides a more limited form of user input (e.g., due to fewer keys or buttons). And while a greater viewing distance provides a more comfortable experience, it can necessitate features that provide a visual design style to ensure clarity, coherence, and readability.

In both the 2' context and the 10' context, the user's expectations, mobility, habits, etc., should be considered when constructing a user interface (e.g., the UI 112). With respect to expectations, the 10' experience is more like watching television than using a computer. As a result, users expect a dynamic, animated experience. They expect that the input device will make their experience simpler, not more complicated. They may also expect applications to be more convenient, simpler to learn, and easier to use than applications controlled by the keyboard or mouse. In general, a UI refers to a graphical user interface, for example, as displayed on a screen, a monitor, by a projector, etc.

Consider an example where the WINDOWS® MEDIA CENTER EDITION™ operating system or platform (Microsoft Corporation, Redmond, Wash.) serves as a host for an application, which may be referred to as a hosted application. In this example, when a user opens the hosted application while video or TV is playing, an exemplary UI framework feature associated with the host platform moves the video or TV playback into a small window at the lower left of the screen, called a shared viewport. When the shared viewport is visible, it will cover any content in the lower left corner of the hosted application's UI (i.e., displayed page). For example, the viewport may have a width of 274 pixels and a height of 192 pixels for a screen resolution of 1024×768. In this manner, the exemplary UI framework manages execution of an application that runs concurrently with another application (e.g., a media presentation application or feature associated with the host platform). Of course, a user may develop a UI with knowledge of such UI behavior or behavior of other applications that may operate concurrently. As an alternative, with respect to the viewport, a script to close the shared viewport could be used, assuming the host allows for execution of such a script on behalf of the hosted application.

In the foregoing example, the platform served as a host to the application in what may be referred to as a parent-child relationship. The relationship between a platform and an application may be parent-child, child-parent or peer. As described herein, a platform typically serves as a host and an application typically seeks to establish a relationship with the platform whereby the platform may expose one or more functionalities to the application (e.g., through one or more APIs). A platform may also manage an application. Various exemplary methods, presented below, demonstrate how functionalities may be exposed to an application and how an application may be managed.

As described herein a platform generally refers to a media platform that may include other functionality. For example, a media platform may provide for control of appliances, property security control, etc. A media platform may be usable in a home for presentation of media and for controlling various home appliances (e.g., kitchen, climate, security, cleaning, etc.). Thus, a host may communicate with various devices as appropriate.

A platform generally relies on a computer for operation. A host platform may execute on a host computer or a host system. For example, a host computer may include software for media presentations, organization, acquisitions, etc. Such a host computer generally provides for display of graphical user interfaces. Further, such a host computer may receive directly or indirectly commands issued via a remote control. While various exemplary methods, modules, applications, etc., refer to a host system, a host platform or a host computer may be substituted, as appropriate. While an exemplary computing environment is shown in FIG. 6, with various associated features, a host may include the same, less or more features.

Any of a variety of applications may seek to enter into a relationship with a platform. For example, an HTML application may seek to establish a relationship with a platform to present various UI components that allow a user to browse media content (e.g., songs, movies, books, etc.). Such HTML applications may include script or other coded functionality (consider, e.g., dynamic HTML, etc.). With respect to the aforementioned 10' context, UI components of an HTML application should generally provide for suitable viewing at a distance and navigation via commands issued using a remote control.

As another example, consider a .NET® framework application (Microsoft Corporation, Redmond, Wash.) built as a .NET® framework assembly, which is a collection of types and resources that are built to work together and form a logical unit of functionality. Such an assembly or other code (e.g., managed, compiled, DLL, etc.) may be referred to as an "add-in" to an exemplary platform (e.g., an add-in to the Media Center Edition™ platform). The type of relationship between an add-in application and the platform may depend on any of a variety of factors and, where appropriate, the platform may be considered a host and the add-in application a hosted application. An add-in application typically extends the functionality of the target platform. An add-in may be a background add-in or an on-demand add-in, the former of which is typically initiated by the host and the latter of which is typically invoked by a user or other application as appropriate.

For a variety of reasons (e.g., logistic, operational, security, etc.), an exemplary platform may require that all applications (e.g., HTML applications and add-in applications) be registered. In general, a registration process for an application adds information about the application to a platform or system registry. A platform may use such information to manage the application, to allow for one or more entry points to a collection of UIs associated with the platform, or for other purposes.

As described herein, a registration process relies on an exemplary registration application or method associated with a platform. Thus, an exemplary platform may include an exemplary registration application that allows for registration of one or more applications. Again, the types of applications that may be registered or require registration will generally depend on any of a variety of factors. While various exemplary registration applications pertain to registration, an exemplary registration application or method may allow for unregistration of an application or a group of applications.

Figure 2:
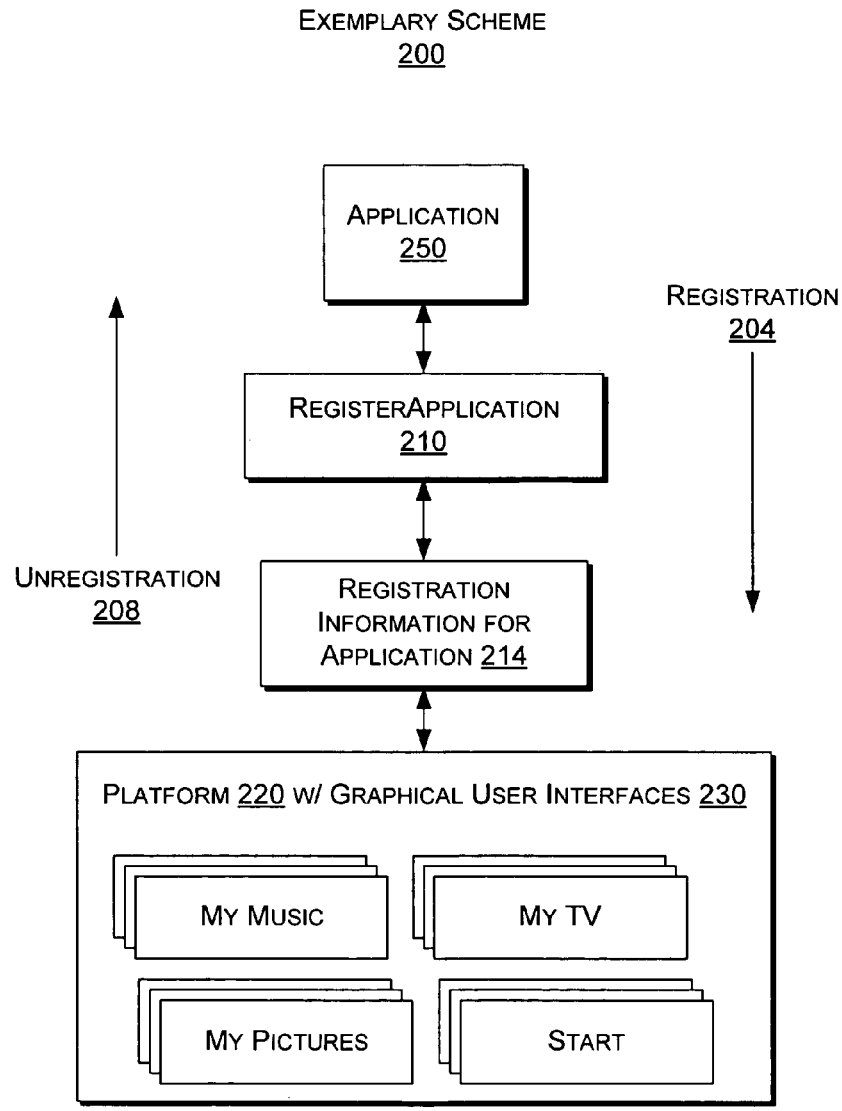
FIG. 2 is a diagram of an exemplary registration method and an exemplary unregistration method for an application.

FIG. 2 shows an exemplary scheme 200 that includes an exemplary method for registering applications 204 and an exemplary method for unregistering applications 208. The exemplary methods 204, 208 rely on a registration application 210. In this example, the registration application 210 can register or unregister an application 250 with respect to a platform 220 that includes graphical user interfaces 230, which are sometimes referred to as "pages" (consider, e.g., a typical Web "page"). As already mentioned, registration or unregistration may also account for entry points into the platform 220.

With respect to HTML applications or the like, an entry point is generally a link to a particular page in the HTML application that may include an identifier, a URL, a title, a description, or an image. In the example of FIG. 2 where the UIs include UIs for categories such as "My Music", "My TV", "My Pictures", an entry point may be associated with a category that can determine the location(s) in the graphical user interfaces 230 where an entry point is placed. A category such as "My Music" may have a main page and various other pages that form a hierarchy of pages for the category. In some instances, such pages may be accessed directly from a page associated with a different category.

With respect to an entry point for add-in applications or the like, consider an on-demand add-in application invoked by a user to perform a discrete, synchronous task. The user may invoke the on-demand add-in through entry points in the graphical user interfaces 230 of the platform 220. An entry point for such an add-in may include several UI components, an image (e.g., a Portable Network Graphics (PNG) format image, etc.), a title string, and a descriptive string that describes the purpose of the entry point. An on-demand add-in application entry point may also have an associated category that can determine the location(s) in the graphical user interfaces 230 where the entry point appears. An add-in may have multiple entry points in various locations in the platform 220. An exemplary platform may limit an add-in application's ability to present UI components. In some instances, an add-in application may be associated with a Web site, an HTML application or UI components presented outside of the platform to provide for a particular user experience or user input.

As already mentioned, a registration process may add information to a registry. With respect to add-in applications the exemplary registration process 204 may add information about the add-in application and its entry points to a registry to thereby enable the platform 220 to locate, load, and run the add-in application, and to display its entry points in the collection of graphical user interfaces 230.

Referring again to FIG. 2, the process of registration 204 generates registration information 214 for the application 250. In particular, the information 214 generally allows for proper operation of the application 250 with respect to the platform 220. The term "proper operation" is typically from the perspective of the platform 220 or a user, as the platform 220 or a user may restrict operations of the application 250 based on security, privacy, personal choice, etc.

As already discussed, the application 250 is typically a software component that extends the capabilities of the platform 220 by adding new functionality (e.g., a new service or media experience) that a user can access through one or more graphical user interfaces 230. Where the application 250 is an HTML application it may consist of one or more HTML pages that use XML, scripting, ActiveX controls, or other familiar client-side Internet technologies. As such, an HTML application typically seeks to display UI components.

The exemplary registration process 204 and exemplary registration application 210 may rely on information specified in the form of elements in a markup language. For example, sample syntax follows for an exemplary application element, an exemplary category element and an exemplary entry point element. These exemplary elements may include specific information that pertains to HTML applications, add-in applications or other types of applications, as appropriate.

Sample Syntax for an Exemplary Application Element

```
<application
    title="title"
    id="GUID of application"
    url="URL of application"
    bgColor="RGB(rrr,ggg,bbb)"
    name="name"
    CompanyName="company name"
    startImage="path to image"
    thumbnailImage="path to image"
    NowPlayingDirective="close" | "pause" | "stop" | "mute"
>
</application>
```

The sample syntax includes various attributes including title, id, url, bgColor, name, CompanyName, startImage, thumbnailImage, sharedViewport, and NowPlayingDirective. The title attribute is a string that specifies the title of the application. The id attribute is a string that specifies the globally unique identifier (GUID) for the application. The url attribute is a string that specifies the path to the application. The bgColor attribute may be used or a BGColor property to set a background color of for an HTML application's page or pages. The name attribute is a string that specifies the name that appears as a label on the application's button in, for example, a graphical user interface 230 Start menu. This attribute may also specify the name that appears on a thumbnail shortcut in a graphical user interface that lists more programs (i.e., more applications whether part of the platform or registered). The CompanyName attribute is a string that specifies the name of the company that authored the application. The exemplary registration application 210 optionally uses this name in a dialog box to query a user as to whether the user wants to add a new application item from the specified company. This particular action provides the user with some degree of security during a registration process.

The startImage attribute is a string that specifies a path to an image (e.g. PNG format, etc.) that appears, for example, when a start menu button for the application is selected (e.g., has the focus as described with respect to the exemplary context 100 of FIG. 1). The thumbnailImage attribute is a string that specifies a path to an image (e.g., PNG format, etc.) that appears, for example, on a thumbnail icon in a "More Programs" page of the platform 220. The sharedViewport attribute is a string that indicates the state of a shared viewport.

The sharedViewport attribute may be used with so-called Media Center Link (MCL) files, which is typically a file that has a .mcl extension and contains XML code defining the attributes and requirements of an application hosted by, for example, the platform 220. In some instances, information in a MCL file may be used to add or register an HTML application.

As already mentioned, the exemplary registration application 210 may account for entry points for the application 250. An "entrypoint" element may be used to define each entry point into the platform 220. In a specific example, an entry-point element includes the following sample syntax:

Sample Syntax for An Exemplary Entry Point Element

```
<entrypoint
    id="entry point GUID"
    url="URL of entry-point page"
    run="path of .exe file"
    addin="className,
assemblyName, Version=version,PublicKeyToken=publicKey,
Culture=culture"
    title="title"
    description="description"
    imageUrl="URL of image"
    context="context"
>
</entrypoint>
```

This sample element includes various attributes. The id attribute is a string containing a GUID (i.e., a globally unique identifier) that uniquely identifies a particular entry point. The url attribute is a string that specifies the path to an entry point page in the application 250. The run attribute is a string that specifies the full or relative path to an executable file on the local machine that, for example, uses the operating system

220. The addin attribute is a comma-separated string that defines the attributes of an add-in application. The title attribute is a string that identifies the entry point and it may appear at the top of a page when the entry point is selected. The description attribute is a string that describes a purpose of the entry point. The imageUrl attribute is a string that specifies a path to an image (e.g., PNG format image, etc.) that represents the entry point. The context attribute is an application-defined string that the platform 220 may provide to the application 250 when the entry point is selected, which may be an arbitrary set of parameters for the application 250. Again, such an attribute may be part of a security system for the platform or user thereof.

The exemplary entrypoint element may be used by the registration application "RegisterApplication" 210. With respect to the aforementioned url and run attributes, an entrypoint element for an application should include the url in the case of an HTML application or the run attribute in the case of an application that runs outside of the platform's environment. Where the application is an add-in application the entrypoint element should include the addin attribute. An addin attribute element can be a string in the following format: "className, assemblyName, Version=version, PublicKeyToken=publicKey, Culture=culture" where class-Name is the full name (assembly and class) of the add-in application's implementation of a class that inherits from the IAddInModule interface; assemblyName is the name of the add-in application's assembly; version is the version number of the add-in application; publicKey is the public portion of the cryptographic key used to sign the add-in application; and culture is the cultural designation of the add-in application. It may be required that the version, publicKey, and culture values be an exact match with the strong-name information stored in the add-in application's assembly.

The exemplary registration application 210 may also associate the application 250 with one or more categories of features, media, etc., of the platform 220. For example, the platform 220 shows various graphical user interfaces 230 for the categories "My Music", "My TV", and "My Pictures". To provide for association between the application 250 and one or more categories, a category element may be used. For example, an exemplary category element may specify one or more categories for each of an application's entry point(s).

Sample Syntax for an Exemplary Category Element

```
<category
   category="host system category"
>
</category>
```

This exemplary element includes a category attribute that is a string that identifies the host system's category for the hosted application's particular entry point. For a background add-in, this attribute may be "Background". For an on-demand add-in application or an HTML application, this attribute may be selected from various categories such as, but not limited to: Internet Radio, More Programs, More With This\Audio\Album, More With This\Audio\Artist, More With This\Audio\Playlist, More With This\Audio\Song, More With This\Audio\Genre, More With This\DVD, More With This\Picture, More With This \Video, New For Me Services\Audio, Services\Movies, Services\Pictures, Services\Radio, and Services\TV. An exemplary host suited for media presentation, organization, acquisition, etc., may use such categories or other categories.

Another exemplary element may specify capabilities required by the application 250. For example, the application 250 may require certain capabilities of the platform 220 as implemented on a machine (e.g., a computer such as in the exemplary computing environment 600 of FIG. 6). An exemplary element may have the following sample syntax:

Sample Syntax for an Exemplary Capabilities Element

```
<capabilitiesRequired
   directX="True | False"
   audio="True | False"
   video="True | False"
   intensiveRendering="True | False"
   console="True | False"
>
</capabilitiesRequired>
```

The sample syntax for the exemplary capabilities element includes various attributes. For example, a directX is a string that indicates whether the application requires DirectX support. An audio attribute is a string that indicates whether the application requires audio support. A video attribute is a string that indicates whether the application requires video support. An intensiveRendering attribute is a string that indicates whether the application contains graphics that require high-end rendering capabilities. A console attribute is a string that indicates whether the application requires resources that are only available or meaningful from a computer's console, rather than from a remote session. For example, an LCD projector application that turns the projector on and off through a COM port.

The aforementioned exemplary elements are optionally used in a registration process or an unregistration process (e.g., 204, 208) that may include specifying one or more entry points. These exemplary elements may pass markup language code (e.g., XML code) to the exemplary registration application 210. The various attributes listed for each exemplary element may be optional or others may be included. In such an exemplary scenario, the application element may specify a path to the application 250 and set various application attributes; the entrypoint element may specifies an entry point into the platform 220; the category element may specify a category for an entry point; and the exemplary capabilities element may specify capabilities that are needed to successfully run the application 250 or that are otherwise desirable for best operation of the application. A user may optionally limit resources available to an application through, for example, selection of settings of a host where, depending on the settings, an application may be limited in operation.

While various exemplary elements have been described, the exemplary registration application 210 may be an exemplary method that uses the following sample syntax: RegisterApplication(sXMLAppInfo, fUnRegister, fAllUsers). Regarding the parameters of this particular exemplary method, the sXMLAppInfo parameter is a string that contains the application, entrypoint, and category elements (e.g., as XML elements). Again, these elements identify the application, its entry point(s), and the category or categories in which the entry point(s) appear. As an alternative, this parameter can specify the path to a markup language file (e.g., an XML file) that contains the application, entrypoint, and category elements for the application. The fUnRegister parameter is a Boolean value that indicates whether to unregister the application. The fAllUsers parameter is a Boolean value that indicates whether to register or unregister the application for all users, or just for a current user. This parameter may have a return value, for example, a number (long) that is zero if the exemplary method succeeded, and non-zero if it failed.

The exemplary method "RegisterApplication" registers an application and its supported entry points with a host. As already mentioned, an entry point may be a link to a particular page in an HTML application, and may include an identifier, a URL, a title, a description, and an image. In general, each entry point is associated with at least one category associated with the host, which may determine one or more locations in a plurality of host user interfaces where an entry point(s) is (are) placed.

In a specific example, the XML code specified in the xmlAppInfo parameter contains a single application element with one or more nested entrypoint elements. Each entrypoint element typically has at least one nested category element and may have more than one nested category element. In scenarios where an application calls such an exemplary method, the host may display a dialog box that lets the user confirm or cancel the registration process. For example, a user may request use of an HTML application or an entity may require a host system to use an HTML application for consumption of media, use of services, etc. As such components of an application may require registration with the host system prior to use or "being hosted", an application may call the exemplary method. As an alternative, a surrogate or helper application may call the exemplary method to thereby allow for registration of the application.

The exemplary method may throw exceptions after being called, for example, the following exceptions may be thrown: "The specified application is already registered", "The specified application is not registered", and "The specified application can not be registered, access denied". Of course, other exceptions may be thrown as desired or required.

An exemplary segment of code for registering an application with one entry point appears below in JScript:

Exemplary Code Segment for Registering an Application function MyRegisterApp( )

```
{
    var strXML;
    strXML = "<application
            title=\"My MC Application\"
            id=\"{A0E0DD28-6C4C-40c4-A8A1-F7B686786940}\"
            CompanyName=\"Microsoft\">"
        +"<entrypoint
            id=\"{A0E0DD28-6C4C-40c4-A8A1-F7B686786941}\"
            url=\".\MyMCApp.html\"
            title=\"My Album Item\"
            description=\"Item 1\"
            ImageUrl=\".\Item1.png\">"
        + "<category category=\"More With This\\Audio\\Album\"/>"
        + "</entrypoint>"
    + "</application>";
    RegisterApplication(strXML, false, true)
}
```

This exemplary segment includes a call to the exemplary method RegisterApplication and it specifies various information as already discussed, such as, but not limited to, an entry point URL, a category, and various ids (e.g., GUIDs). While this exemplary segment includes information for a single entry point, additional entry points may be specified; thus, in a fairly small segment of code, multiple entry points for an application may be registered with a host system.

As described with reference to FIG. 2, registration or unregistration of an application may occur through use of an exemplary registration application or method or an exemplary unregistration application or method. Registration of an application may be a prerequisite to gain access to a platform's functionality or information or to extend functionality of a platform.

Figure 3:
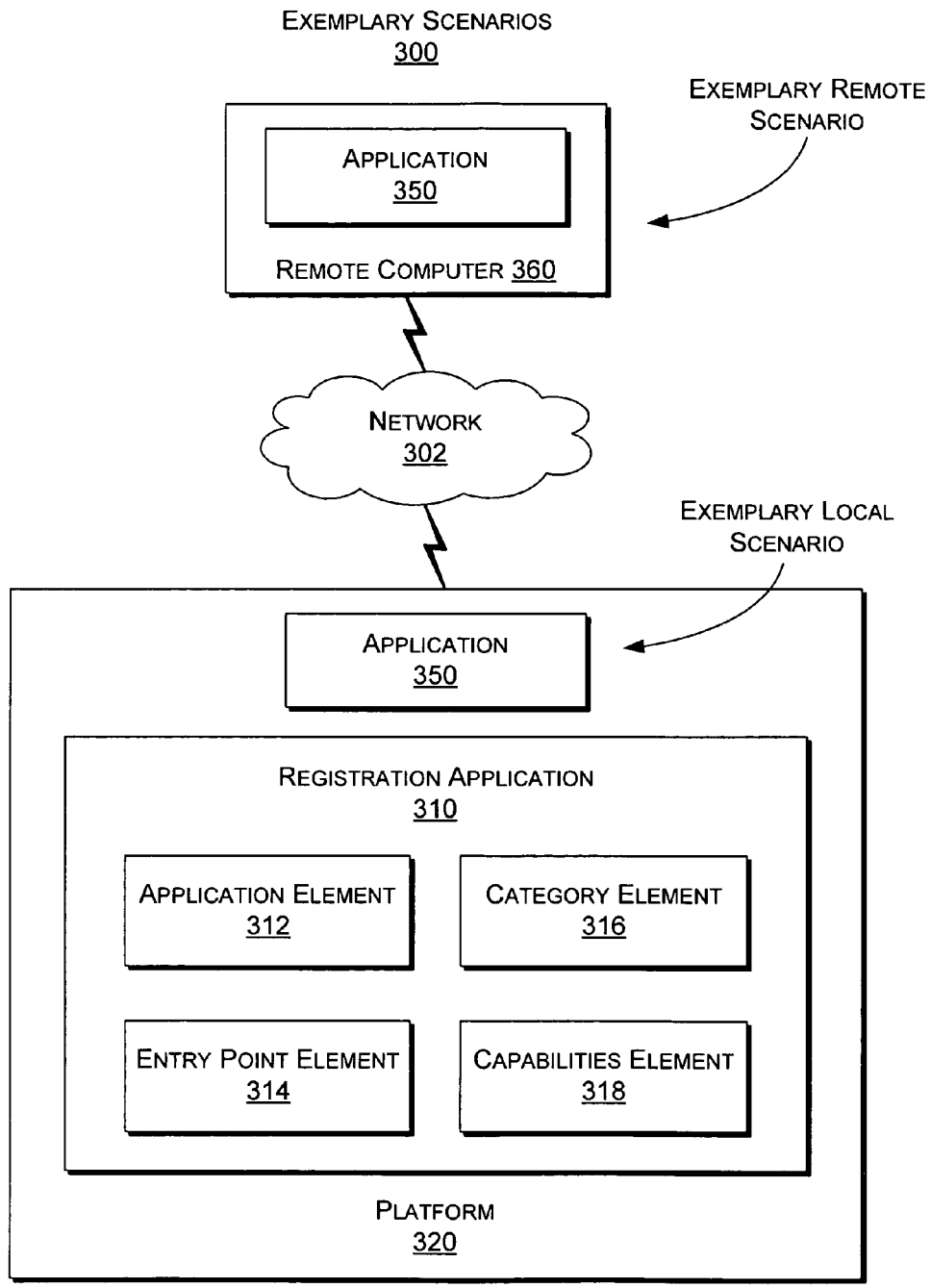
FIG. 3 is a diagram of an exemplary registration application for registering or unregistering an application, locally or remotely.

FIG. 3 shows a block diagram of two exemplary scenarios 300 that use an exemplary registration application 310 (e.g., consider the RegisterApplication 210) resident on a platform 320 (e.g., consider the platform 220). One of the exemplary scenarios involves an application 350 resident on a remote computer 360 that can access the platform 320 via a network while in the other exemplary scenario the application 350 is resident on the platform 320 and yet unregistered. The network 302 may be any suitable network, such as, but not limited to, wired or wireless (e.g., 802.11, satellite, etc.). The former scenario pertains to an example where a remote system may seek to register an application with a platform via remote calls to the registration application 310 while the latter scenario pertains to an example where an application stored in memory may seek registration via local calls to the registration application 310. Other scenarios may be possible where such an exemplary registration application may register or unregister applications. In these scenarios, a surrogate or helper application may operate on behalf of the application 350 where the helper application is executing locally or remotely.

In both of the exemplary scenarios, an exemplary registration process includes calling the registration application 310 to register the application 350. In this example, the registration application 310 is an application program interface (API, sometimes referred to as an application programming interface) of the platform 320 which the application 350 relies on to make requests of the platform 320 or optionally other applications resident on the platform 320.

As an API, the registration application 310 includes a set of procedures for information exchange, for example, between the application 350 and the platform 320. The set of procedures for information exchange may be considered elements (or in a markup language "tags"), such as those described above and shown in FIG. 3. In this example, the registration application 310 includes four elements: an application element 312 for exchange of information about the application 350, an entry point element 314 for exchange of information about one or more entry points for the application 350 with respect to the platform 320, a category element 316 for exchange of information about associating the application 350 with one or more functional or media-related categories of the platform 320, and a capabilities element 318 for exchange of information about capabilities required by the application 350 or about capabilities available on the platform 320. The platform 320 may include a page (e.g., graphical user interface) that lists each registered application (e.g., a settings page). Such a page may also allow a user to restrict a registered application.

Thus, as described with reference to FIGS. 2 and 3, an application may be hosted by a platform whereby at least a registration process is required to register the application and to optionally specify one or more entry points for the application. Other features may pertain to capabilities, categories, security, associations, etc.

An exemplary computer-implementable method includes receiving a call from an application (e.g., the application 250, the application 350, etc.) executing on a host computer, the host computer (or host platform or host system) having a collection of graphical user interfaces (e.g., the graphical user interfaces 230) and, in response to the call, registering the application whereby the registering provides one or more entry points for the application wherein each entry point corresponds to at least one of the graphical user interfaces of the collection of graphical user interfaces. According to such an exemplary method, an application may be standalone executable code (e.g., a stand alone executable code application executing on the host). According to such an exemplary method, executing may occur, for example, as a web page or script in a browser associated with the host computer (e.g., an embedded browser). As an alternative, a surrogate or helper application may issue the call on behalf of the application where the helper application is executing locally or remotely.

In such an exemplary method, the application may be an HTML application, an application built as an assembly, etc. With respect to the graphical user interfaces of the host computer, one may allow a user to unregister the application wherein unregistration removes all entry points for the application. With respect to the entry points, each entry point may corresponds to a parameter for a globally unique identifier (GUID) of a graphical user interface of the collection of graphical user interfaces. In this exemplary method, an entry point may correspond to an item of a context menu, which upon selection may launches the application, or an entry point may correspond to a new information graphical user interface that allows the application to present new information (see, e.g., "New for Me" below). Such an exemplary method may be at least in part embodied on a computer-readable medium as computer-executable instructions for performing, for example, registration of an application.

With respect to the exemplary context 100 of FIG. 1, a hosted application (e.g., the application 250 or the application 350) may include one or more graphical user interfaces (full-screen or partial screen) that are suitable for viewing at a distance and can be navigated by using the remote control. While audio user interfaces may also be included, generally, a hosted application includes one or more graphical components. Various features are discussed further below.

Figure 4:
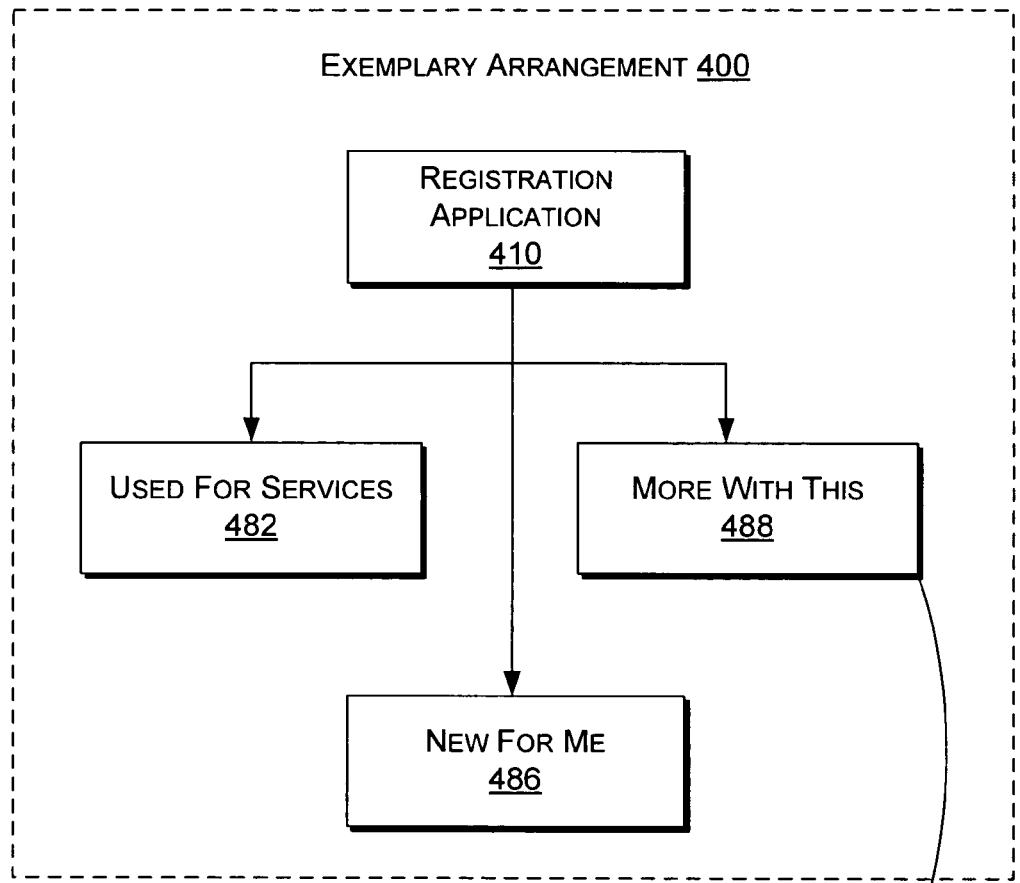
FIG. 4 is a diagram of an exemplary arrangement whereby a registration application optionally allows for registration of an application that can then access various features associated with a user interface.
Figure 4:

FIG. 4 shows an exemplary arrangement of features 400 that includes functional modules may interact with an exemplary registration application 410. The functional modules include a "Used for Services" module 482 (e.g., for media handlers, etc.), a "New For Me" module 486 (e.g., for notification of "freshness", etc.), and a "More with This" module 488 (e.g., contextual links, etc.). Of course, other names may be appropriate for such modules given the exemplary functionality associated with each module as described below. For example, the "New For Me" module 486 may be referred to as a "New Information" module whereby an application (e.g., the application 250 or the application 350) acquires new information such as new content or new capabilities.

The "Used for Service" module 482 provides for associating an application with one or more categories of features. The "New for Me" module 486 provides a feature such as a particular page that a user may access to find new content or new capabilities provided by one or more extensibility applications (e.g., the application 250, the application 350, etc.). A user may access such a page from a "Start" page, a "More Programs" page, etc. The module 486 may become visible or accessible to a user only when items become available to a "New For Me" or other suitable page.

Where media content becomes available in association with a registered application, a "New For Me" item may include the title of the new content and a brief description of the new content. In general, each item includes or operates as a link whereby selecting the item causes navigation to a specified destination for possible consumption of the content (e.g., purchase, download, stream, etc.).

As already mentioned, the various modules of the arrangement 400 may interact with the registration application 410. For example, an application may register such "New For Me" items by calling the registration application 410. Restrictions may apply to the application's ability to register items, for example, a limit of one "New For Me" item for each registered application GUID may be imposed. Further, "New For Me" entries may be restricted to registration by local applications, i.e., a remote application may be prohibited from registering "New For Me" items. The exemplary "New For Me" module 486 may sort items by creating time stamps, for example, with the most recent item first on a list. As already mentioned, a platform may include a settings page. Such a page or other feature may allow a user to prevent a registered application from adding "New For Me" items. Such features may be a component of a registration application (e.g., the registration application 410) used for registering applications.

As an example, consider a movie delivery service that relies on a registered application to provide information to a user of a host system. Such a service may desire to add a "New For Me" item when new media content becomes available through the service. The registered application of the service may call the registration application to "register" such an item.

The "New For Me" module 486 may include a method that can add or update a "New For Me" item. For example, consider the sample method:

Sample Code for Exemplary Method for "New For Me"

```
public bool SubmitNewForMe(
    string title,
    string description
);
```

This method includes a title parameter, which is a string with, for example, an updated title, and a description parameter, which is a string with an updated description. This exemplary method may return a value (e.g., a Boolean value) to indicate if update or entry occurred for the item.

The exemplary "More With This" module 488 provides a context menu for an item or various items (e.g., image files, sound files, etc.). For example, FIG. 4 shows an exemplary user interface 487 with a context menu 489. The context menu 489 includes a <other app.>item, which may be used as an entry point for an application registered by the registration application 410. Thus, the "More With This" module 488 interacts with the registration application 410 to provide an entry point in a context menu (e.g., the context menu 489).

Figure 5:
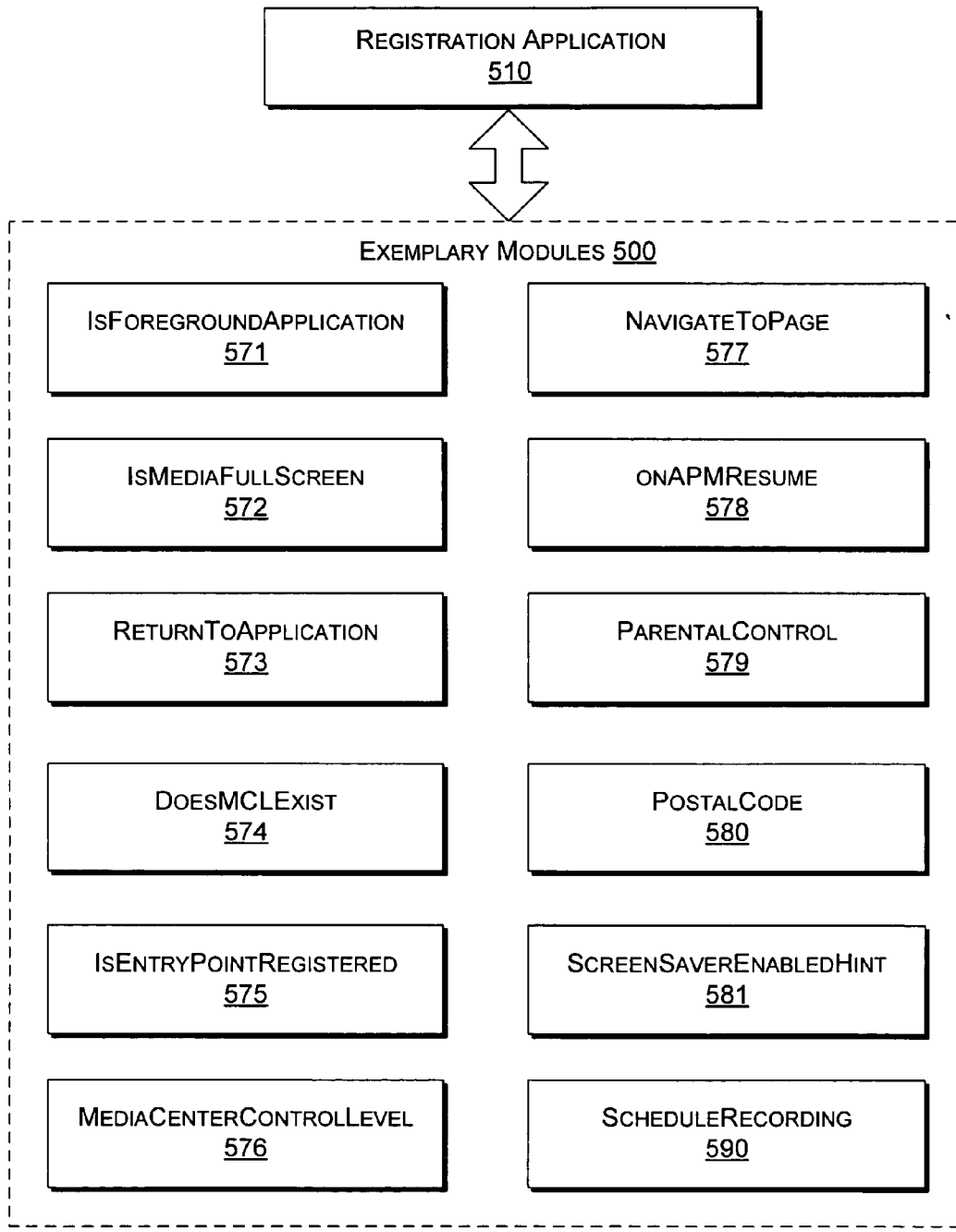
FIG. 5 is a diagram of an exemplary registration application and various modules that may interact with the registration application or a registered application.

FIG. 5 shows an exemplary registration application 510 and various exemplary modules 500 that may interact with the registration application 510. An exemplary platform, computer or system may include any of the various modules or other modules. In general, such exemplary modules pertain to operation of an application with respect to a host. These exemplary modules are discussed below. Each exemplary module may be optionally embodied as computer-executable instructions on one or more computer-readable media, for example, as part of a host platform and executable by a host computer.

Module 571: Foreground

An IsForegroundApplication module 571 includes a method that can indicate, when called by a registered application, whether the registered application is the current foreground application, or whether it has invoked the currently playing media in a host system. The module 571 may include one or more parameters. For example, an entryPointId parameter may be a string containing a GUID that uniquely identifies an entry point for the application. The module 571 may return a Boolean value to indicate if the calling application is the current foreground application.

Such a module may restrict actions take by an application or a service connected with such an application. For example, if an application is not the current foreground application in a host system, then it may be restricted from causing changes to the current graphical user interface. Thus, the application may be restricted from causing display of pop-ups, audio, a foreground graphic, returning the user to an HTML application, etc. In some instances, a notification graphic may be available whereby an application that is not the foreground application can indicate that it has information for a user (e.g., a small icon, a small perimeter text window, etc.). However, in general, such notification mechanisms are under user control and can be optionally deactivated.

Such a module may also provide an application permission to cause presentation of graphics, audio or other actions in instances where a user invoked the application. For example, consider a movie trailer that may run in a viewport (e.g., a region of a graphical user interface). While this viewport may not be considered the foreground application, due to the user having invoked the application, once the trailer is finished, the application may be able to cause display of various information, navigation of a user to a movie service page, delivery of discount coupons, movie tickets, etc.

Module 572: Full Screen

An IsMediaFullScreen module 572 is a property that includes a property value (e.g., Boolean or other) to indicate whether a host system is in full-screen mode. A registered application may use this property to determine whether a call to a ReturnToApplication function would be appropriate (see, e.g., the ReturnToApplication module 573).

Such a full screen module may allow an application to determine whether it has permission to take subsequent actions. For example, if an application causes display of a movie trailer in full screen (e.g., as opposed to the aforementioned viewport example), then the application may cause presentation of another trailer upon completion of a trailer or it may navigate a user to a particular page or graphical user interface. In some instances, a screen may appear when a media file has reached the end of the file (e.g., finished display). The application author may wish to return the user automatically to the page that invoked playback, thus an exemplary full screen module may allow a movie or other media application to avoid display of a blue screen or a blank screen.

In a particular example, a user uses an application to navigate to the OSCAR(S)® ACADEMY AWARD(S)® web page (Academy of Motion Picture Arts and Sciences) and selects a "behind-the-scenes" video interview with actor X. Where the video is displayed as full screen video or substantially full screen (e.g., a border or small overlay for notifications, etc.), then the application may be able to separately manage a play list, for example, of video interview with actor Y, actor Z, etc. However, if the application is not displaying full screen, then it may not have such control of the user interface of the host system. In some scenarios, such an application may rely on an ASX file. ASX files are textual command files that manage streaming of media files. ASX files are generally small in size (e.g., about 1K) because they usually contain only instructions. A browser application can download an ASX file to a cache directory, launch a media player and then start streaming media per the instructions. However, an ASX file is limited in that the contents of the play list must be specified before any playback commences. By detecting and managing playback state even when the content is full-screen, an application may provide play list functionality, even for a play list generated or modified by the user or application during playback.

As described with respect to the exemplary foreground module 571 and the exemplary full screen module 572, an application may inquire as to its status on a host system and determine whether particular actions are permitted. In general, an application should be prevented from acting in an unexpected manner that may degrade a user's experience.

Module 573: Return to Application

The ReturnToApplication module 573 includes a method that can cause a host system to return some degree of priority or control to a calling registered application. In particular, the module 573 may return a user to an application that invoked media playback or to a particular page of an application that invoked media playback. The module 573 may have syntax such as "ReturnToApplication( )" without parameters and without a return value. Consider a registered application that plays video in full-screen mode. Such an application can call this method to regain the focus after full-screen playback concludes. Before a registered application calls the ReturnToApplication module 573, it may call an IsApplicationActive module (not shown in FIG. 5) to determine whether the registered application is being displayed. It may also call the IsMediaFullScreen module 572 to determine whether the current media is in full-screen mode.

With respect to the modules 571, 572, 573, these can enhance a user's media experience as they can individually or collectively aid in controlling display of media or ULs. An exemplary computer-implementable method includes receiving a call from an application (e.g., the application 250, the application 350, etc.) executing on a host computer (or host platform or host system), the host computer having a collection of graphical user interfaces (e.g., the graphical user interfaces 230) wherein the application comprises an entry point associated with one of the collection of graphical user interfaces; providing a parameter value for the entry point; and, in response to the call, based at least in part on the parameter value, indicating whether the application has the focus of the host computer or the application invoked media playing on the host computer. According to such an exemplary method, executing may occur, for example, as a web page or script in a browser associated with the host computer (e.g., an embedded browser). According to such an exemplary method, an application may be standalone executable code (e.g., a stand alone executable code application executing on the host). As an alternative, a surrogate or helper application may issue the call on behalf of the application where the helper application is executing locally or remotely. In general, a foreground application will have the focus of the host computer. Again, referring to the exemplary context 100 of FIG. 1, the use of a focus facilitates navigation and control of media centric system.

The aforementioned exemplary method may provide a value that indicates either that the application has the focus of the host computer or the application invoked media playing on the host computer or that neither condition is true. Such an exemplary method may further include permitting or restricting an operation of the application if the indicating indicates that the application has the focus of the host computer or the application invoked media playing on the host computer.

With respect to the module 572, an exemplary method may, in response to a call by an application, indicate whether the application is operating in a full screen mode or has invoked playing media in a full screen mode. The module 572 may provide a value indicating whether the application is operating in a full screen mode or has invoked playing media in a full screen mode and the module 573 may use such a value to indicate whether the application can regain the focus of the host computer after conclusion of the playing media in the full screen mode. In general, any of the various modules or methods described herein may be at least partially embodied as computer-executable instructions on a computer-readable medium.

Module 574: MCL Exist

A DoesMCLExist module 574 includes a method that can indicate whether an MCL file already exists for a particular category of a registered application. The module may include one or more parameters such as a category parameter and a URL parameter. Such a category parameter may be a number that indicates a category for the registered application (e.g., "0" More Programs, "1" Radio "3" Games, "4" Temporary placeholder, etc.). A URL parameter may be a string secifies a path to an HTML Web application (e.g., containing "http://"). The module 574 may return a Boolean value that indicates whether the MCL file exists. This module may throw an exception if the URL and the caller's fully qualified domain name are different. Such a process can increase security.

With respect to security, a scenario where a user uses one service that may wish to inquire whether the user also uses another service. For example, consider a user that uses a sports service "Sports 1", which has a competitor "Sports 2". For purposes of security, a registered application associated with the Sport 1 service can only ask about itself, i.e., it cannot inquire whether the user also uses an application associated with the Sports 2 service. Such a security mechanism relies on, for example, a URL parameter whereby if the caller of information and a qualified domain name differ access is denied to such information (e.g., an exception is thrown or an indicator that access is denied is communicated to the caller).

While the foregoing example mentions a "domain" level for checking, a GUID level security mechanism may be used in addition to or as an alternative to a domain level security mechanism. For example, if a calling application's GUID does not match a currently executing application's GUID, then access to information may be denied (e.g., only information indicating that access was denied may be communicated). While access to information is mentioned, access to navigational control may be denied. For example, where a match does not occur at the domain level or at the GUID level, then the calling application may have limited navigational control or other control (e.g., graphic, audio, other actions).

Module 575: Entry Point Registered

An IsEntryPointRegistered module 575 includes a method that can indicate whether a calling application (registered or unregistered) already has a particular entry point registered with a host system. Such a method may include the following syntax: IsEntryPointRegistered(entryPointId), wherein the parameter entryPointId is a string containing a GUID that uniquely identifies an application entry point. This method may return a Boolean value that is true if the entry point is already registered, and false otherwise. In general, such a method does not verify whether a particular application is registered, only whether a particular entry point is registered for the calling application.

Module 576: Host Control Level

A MediaCenterControlLevel module 576 is a property that includes a property value. While the module name includes "MediaCenter", such a module may be referred to as a host control level module. This property retrieves the current settings that determine the level of control that an application (e.g., the application 250, the application 350, etc.) has with respect to a host system. The property value may be a read-only number that indicates a control level. It may be a combination of values such as "0" applications cannot control or query the host system; "1" applications can control the host system and display notifications; "2" applications can retrieve settings that indicate the current status of the host system; and "4" applications can retrieve metadata associated with the host system or the host system's user(s), for example, a user's postal code.

As already discussed, a host system may include settings that let a user place restrictions on applications (e.g., the application 250, the application 350, etc.) for reasons of security and privacy. Such settings can determine whether such applications are allowed to control a host system or retrieve its settings.

As an example, consider a user that has used the host system to navigate to a media service for audio recordings. The user may cause a registered application associated with the media service to play a particular audio recording. In response, the application may call an exemplary host control level module to retrieve or determine a host control level property setting. Once known, the application can cause appropriate subsequent actions, such as, but not limited to, notifying the user of "if you like the current song, then try this song".

As another example, consider a scenario where the currently played song is not associated with the aforementioned media service, yet, a registered application of the media service can call and access metadata for the currently played song. Further, in response to retrieving and analyzing such metadata, the registered application may notify the user "if you like the current song, then try this song". While this latter example is more invasive than the former, such control may be granted per a host control level property setting.

In yet another example, a user may wish for a consistent experience when consuming media with respect to information about the media. Thus, a particular registered application may be used for presentation of information about media regardless of the source of the media or the service provider. For example, a particular registered application to cause media related information to be presented in a particular information region of a user interface. It may do so using a particular font, a ticker animation, etc. For a consistent experience, a user may wish to use this application for presentation of media information regardless of source or service provider.

Where a user uses more than one media service, a scenario may occur where more than one service recommends media, optionally at particular prices. A user may then decide based on such information which service to use (e.g., when the services recommend the same song at different prices, etc.). Possible scenarios include a registered application that allows a service to present offers for sale or solely information related to media (e.g., a discography, a biography, performance schedule, show times, venues, etc.).

In another example, a registered application for a media service may be denied access to information about searches, browsing or consumption of media provided by the media service. For example, a user may listen to Song X whereby the service provider is denied metadata identifying Song X as a currently played song, i.e., the service provider may, through use of a registered application calling a module, simply discover that the user is listening to a song.

An exemplary host control level module may provide for one or more levels of access. For example, a first level may be a metadata level of access and a second level may be a relatively unrestricted level of control over a host system. In instances where an application attempts to have control at an unpermitted level, a module may provide the application with a script error. Access to levels or information regarding access is optionally controllable by a user (e.g., selection per settings).

Module 577: Navigate to Page

A NavigateToPage module 577 includes a method that can direct a host system to navigate to a specified page in the host systems graphical user interfaces (e.g., the graphical user interfaces 230 of the host system 220 of FIG. 2) and specify contents for that page if desired. Such a method may have the following syntax: NavigateToPage(pageId, params). A pageId parameter is a string that contains the identifier (GUID) of a page of the host system (e.g., a particular graphical user interface in a hierarchy or collection of graphical user interfaces such as the graphical user interfaces 230). A params parameter is a string that contains additional parameters. After being called, if the method succeeds, it returns 0; otherwise, it returns one of the following error values: ERR_COMMAND_REMOVED_WITH_SPAD, which indicates that the destination page was removed with a Set Program Access and Defaults (SPAD) tool; or ERR_NAVIGATION_FAILED, which indicates that the method failed.

In a specific example, the value of the pageId parameter determines the value of the params parameter, as shown in the following table:

| GUID | Host System Page | params |
|---|---|---|
| {ae804109-f3a3-4fe0-8379-518463da7395} | ExtensibilityEntryPoint | GUIDs that identify the destination page in the following format: <applicationGuid\> entrypointGuid. |
| {3798c7a7-c31f-46c4-9782-655f64b5920f} | ExtensibilityURL | URL of the destination page |
| {ec5a86e5-256a-4316-b294-42d5b86a5bed} | FMRadio | Null |
| {7f58b0a0-e85b-4e1e-8726-5f1ba279dd3c} | InternetRadio | Null |
| {6c79b00a-8e02-400f-a6f9-06380d1ddecd} | LiveTV | Null |
| {798b6732-ebbe-4b81-b424-d93bf91b0aad} | MorePrograms | Null |
| {fd331980-26ab-4bac-889f-188e13001a55} | MusicAlbums | Null |
| {c4a709f2-4c53-4db4-95eb-d190a95fcfcf} | MusicArtists | Null |
| {d69fa617-1035-4875-ac6e-ca7bdef8c7b4} | MyMusic | Null |
| {5eaf585f-4273-4ce1-8284-bd60288b88d9} | MusicSongs | Null |
| {3b7ff955-01f6-4f68-9775-4d1216b777b7} | MyPictures | Path to folder |
| {80e2aa59-4c45-493c-9b75-68bb9ec80617} | MyTV | Null |
| {a5abe790-14f9-4075-87a8-e4a940d632ae} | MyVideos | Path to folder |
| {42c5a65e-35d4-48c8-8828-df636825e091} | RecordedTV | Null |
| {dcfa3c0a-d146-4e33-995a-565f8ca1a859} | RecorderStorageSettings | Null |
| {ae33979e-6334-45f6-8490-6e05f4032703} | ScheduledTVRecordings | Null |
| {1436526c-329d-47dd-9afa-458aab0da6e5} | SlideShow | Path to folder |
| {b8eac38a-7fb8-4559-84b5-42999c6864bd} | Start | Null |
| {21e33f7d-c860-49ff-bd74-a94dab62b434} | TVGuide | Null |
| {5b721b57-872d-4ad2-8262-4d6bb2c09c6a} | Visualizations | visualizationName: preset |

In instances where the pageId parameter is ExtensibilityEntryPoint and no applicationGuid parameter is specified, the host system may use the application GUID of the calling application. If the pageID parameter is "Visualizations", then the params parameter is a string containing the visualization name (e.g., from the registry) and preset, separated by a colon. For example, "Ambience:Swirl". If a visualization name is specified but not a preset, the host system may use the default visualization or the previously-selected preset. Similarly, if a preset is specified but not a visualization name, the host system may use the default visualization or the previously-selected visualization.

In general, an exemplary navigate to page module can allow an application to navigate to. a particular page, for example, associated with a collection or hierarchy of pages of a host system.

As an example, consider a registered application associated with a media service that can navigate a user to a visualizations page to allow the user to select a visualization for media consumed via the media service. In some instances, where a standard visualization or set of visualizations may be expected to reside on the host system, the registered application may cause one or more of such visualization to be invoked during media play.

As another example, consider a registered application associated with a photographic image service provider. Such an application may have access to an exemplary navigation module that navigates a user to a "My Pictures" page of the host system. In response, the application may cause a slide show or other display or organization of image files linked with the "My Pictures" page or category therein. In this example, the application may optionally rely on a slide show application of the host system or another application. An application may have access to file path information, for example, paths to image files.

In yet another example, a user may use a registered application associated with a movie service. A page may include a button that allows a user to view icons of all movies downloaded, bought, or rented from the movie service. The application may then assist a user in next steps (e.g., sell, discard, view, rent again, etc.).

Module 578: Resume After Suspension

An onAPMResume module 578 operates as an event that occurs when a host system resumes operation after being suspended to aid in power-saving, noise-heat-reduction, or other reasons. An application (e.g., the application 250, the application 350, etc.) may use this event to refresh data once the host system resumes after being suspended.

When a host system is inactive for a period of time, the host system may suspend substantially all operation, for example, with exception of one or more input channels. A user may also cause suspension by entering a command. In either instance, at the time of suspension, a registered application associated with a new service may have been a foreground application or assigned similar priority. Upon resuming operation, such an application may gain access to fresh information and display the fresh information at the same priority (e.g., foreground application) or at a different priority (e.g., background application or if not formerly foreground, then at foreground). Display may be partial or full screen. Applications that are not news centric or otherwise dependent on timeliness of information may be denied access to such features as provided by the exemplary resume module.

Module 579: Parental Control

A ParentalControl module 579 is a property that retrieves an object (e.g., a ParentalControlSelector object) that is used to select the type of parental control settings to query. The property includes a property value which is a read-only object. This property and object (retrieved by the property) provide a way for an application (e.g., the application 250, the application 350, etc.) to select the type of parental control settings to query. Thus, such an application can, for example, query current parental control settings for movie or TV viewing.

An exemplary parental control feature may rely on entry of a PIN to access certain types of content. A user may be prompted to enter such a PIN via remote control or other input mechanism. Where the correct PIN is not provided, access to content is generally denied. A registered application may request entry of a PIN when a user tries to access a certain type or types of content. Such an application may call the exemplary parental control module 579 (e.g., an API call). In response to such a call, the application may be provided with limited information like an indicator that the correct PIN was entered or that the incorrect PIN was entered or simply an indicator to proceed or to not proceed.

A host system may include a single parental control setting (e.g., on/off) or it may include a variety of settings that optionally work according to some control setting logic. For example, consider CS1 cartoon-like violence "OK", CS2, graphic NOK, CS3 artistic nudity OK, etc. Logic may express the settings as a blob of data that a calling application may expect.

Consider a user that uses an application to watch a sitcom provided by an internet content provider. The application may call the exemplary parental control module 579 to determine if the host system's settings permit viewing of the sitcom. In a first instance, the application may determine whether parental control is enabled by the host system. In this instance, the host system may return a Boolean that indicates control "on". In a second instance, the application may call for information about the nature of the settings or level of parental control enabled. In response, the module may return a blob of data expected and analyzable to some degree by the calling application. The calling application may use the information in the blob to avoid future calls for certain types of media or otherwise tailor access, advertising, etc., of media. In a third instance, the application may call for entry of a PIN, as discussed above.

Thus, as described herein, an exemplary parental control module may provide for multiple call levels, some of these calls may return information without user input and others may require input of a user and return information substantially unrelated to the input (e.g., where entry of a PIN is requested, return does not include any information about the PIN). The exemplary module may return a Boolean value or a blob of data depending on the particular call.

A user may optionally allow for release of certain information (e.g., metadata) or other tailoring of an exemplary parental control module. For example, a return from a call to such a module may indicate playing OK but harvesting of metadata is not OK. In general, user settings with respect to parental control aim to enhance the user's experience and to increase security. The inclusion of Boolean values as possible return values to a basic call (e.g., host system control enabled) can prevent an application from failing in an undeterminable manner.

An exemplary computer-implementable method includes receiving a call from an application (e.g., the application 250, the application 350) executing on a host computer (or host platform or host system), the host computer having a collection of graphical user interfaces (e.g., the graphical user interfaces 230), and, in response to the call, retrieving an object usable to select the type of parental control settings to query. According to such an exemplary method, executing may occur, for example, as a web page or script in a browser associated with the host computer (e.g., an application executing on an embedded browser of the host). According to such an exemplary method, an application may be standalone executable code (e.g., a stand alone executable code application executing on the host). As an alternative, a surrogate or helper application may issue the call on behalf of the application where the helper application is executing locally or remotely.

According to such an exemplary method, the object may allow the application to determine whether parental control is enabled by the host computer or the object may allow the application to return a blob of data related to the parental control enabled by the host computer. In the latter instance, the object may allow the application to call for entry of a parental control code (e.g., a PIN).

Module 580: User Location, Billing or Other ID

A PostalCode module 580 is a property that retrieves a host system user's postal code (e.g., ZIP code) as a property value, if available. In general, media platforms that allow for TV viewing (consider, e.g., the aforementioned WINDOWS MEDIA CENTER® platform) provide guide listings based on a user's ZIP code, which is information that is frequently specified by the user prior to use of other functionality of the platform, including applications that may be registered. The property value is a read-only string containing the postal code. If the user has not provided a postal code, the property value is NULL. If the user's privacy settings block access to the postal code, attempting to read this property will cause an exception to be thrown.

Most service providers (e.g., media, access, etc.) require location information from a user such as a postal code (e.g., ZIP code). An exemplary model may return this code (e.g., as metadata) when called by a registered application. Location information enables applications (e.g., the application 250, the application 350, etc.) to be customized according to a user's location. For example, a news provider could use the postal code to determine what local news, sports, and weather information to provide. A cable television provider may use such information to determine proper channel information (e.g., local channels and specialized regional channels).

Module 581: Screen Saver

A ScreenSaverEnabledHint module 581 is a property that can retrieve or set a value indicating whether a current page of an application (e.g., the application 250, the application 350) allows the screen saver to interrupt, for example, a user's media experience. The property value is a read/write Boolean value that is true if the current application page allows the screen saver to interrupt and false if it does not.

Various logic or criteria may be used to determine whether a screen saver will be blocked. For example, a screen saver may be blocked only when the current media experience meets all of the following criteria: the content is from a hosted HTML application; the current HTML page has set the ScreenSaverEnabledHint property to false; the current HTML page contains a custom viewport; the custom viewport contains video from TV, My Videos, DVD, or visualizations; the video is playing (not stopped or paused); the host system is in full screen mode (that is, the host system shell is maximized). Because this property is not persisted across pages, leaving a page that set the property to false restores the property to true. To maintain the false state, an application (e.g., the application 250, the application 350, etc.) must explicitly set this property on all appropriate pages (e.g., HTML pages, etc.).

Consider an example wherein a television show includes trivia questions that may be displayed on a user interface through use of a registered application. In this example, the television show might be in a viewport and the trivia question may appear in another viewport or as an overlay in the show viewport. A call to an exemplary screen save hint module may allow the application to prevent the screen saver from being launched while the trivia question graphic is displayed. Without logic related to the calling application, an application may attempt to launch a screen saver to the detriment of a user's experience. In general, logic may prevent music or audio alone from preventing the launch of a screen saver. The exemplary screen saver hint module 581 may forget about a previous call or calls from an application and require the application to call every time it wishes to alter screen saver behavior of a host system.

Module 590: Schedule Recording

The schedule recording module is a method that issues a request to a host system to record video or audio at as provided by a media service. For example, the media service may provide a television program, a radio program, etc. In this example, the module relies on a parameter set in a markup language such as XML. The markup language generally follows a markup language schema that includes defined elements related to recording of media (e.g., video, audio, etc.).

An exemplary markup language schema used for scheduling recording may include various tags or elements such as a <clickToRecord> element as a root element, a <body> element, an optional digital signature element, a <metadata> element, one or more <programRecord> elements.

Exemplary Computing Environment

The various examples may be implemented in different computer environments. The computer environment shown in FIG. 6 is only one example of a computer environment and is not intended to suggest any limitation as to the scope of use or functionality of the computer and network architectures suitable for use. Neither should the computer environment be interpreted as having any dependency or requirement relating to any one or combination of components illustrated in the example computer environment.

FIG. 6 illustrates an example of a suitable computing system environment 600 on which various exemplary methods may be implemented. Various exemplary devices or systems may include any of the features of the exemplary environment 600. The computing system environment 600 is only one example of a suitable computing environment and is not intended to suggest any limitation as to the scope of use or functionality of the invention. Neither should the computing environment 600 be interpreted as having any dependency or requirement relating to any one or combination of components illustrated in the exemplary operating environment 600.

Various exemplary methods are operational with numerous other general purpose or special purpose computing system environments or configurations. Examples of well known computing systems, environments, and/or configurations that may be suitable for implementation or use include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like. For example, the exemplary system 100 of FIG. 1 may use a remote computer to generate information for display of a UI wherein the displayed UI operates in conjunction with a remote control or other input device.

Various exemplary methods, applications, etc., may be described in the general context of computer-executable instructions, such as program modules, being executed by a computer. Generally, program modules include routines, programs, objects, components, data structures, etc., that perform particular tasks or implement particular abstract data types. Various exemplary methods may also be practiced in distributed computing environments where tasks are performed by remote processing devices that are linked through a communications network or other communication (e.g., infrared, etc.). In a distributed computing environment, program modules may be located in both local and remote computer storage media including memory storage devices.

With reference to FIG. 6, an exemplary system for implementing the various exemplary methods includes a general purpose computing device in the form of a computer 610. Components of computer 610 may include, but are not limited to, a processing unit 620, a system memory 630, and a system bus 621 that couples various system components including the system memory 630 to the processing unit 620. The system bus 621 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 610 typically includes a variety of computer readable media. Computer readable media can be any available media that can be accessed by computer 610 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 610. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 630 includes computer storage media in the form of volatile and/or nonvolatile memory such as read only memory (ROM) 631 and random access memory (RAM) 632. A basic input/output system 633 (BIOS), containing the basic routines that help to transfer information between elements within computer 610, such as during start-up, is typically stored in ROM 631. RAM 632 typically contains data and/or program modules that are immediately accessible to and/or presently being operated on by processing unit 620. By way of example, and not limitation, FIG. 6 illustrates operating system 634, application programs 635, other program modules 636, and program data 637.

The computer 610 may also include other removable/ non-removable, volatile/nonvolatile computer storage media. By way of example only, FIG. 6 illustrates a hard disk drive 641 that reads from or writes to non-removable, nonvolatile magnetic media, a magnetic disk drive 651 that reads from or writes to a removable, nonvolatile magnetic disk 652, and an optical disk drive 655 that reads from or writes to a removable, nonvolatile optical disk 656 such as a CD ROM or other optical media (e.g., DVD, etc.). Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 641 is typically connected to the system bus 621 through a data media interface such as interface 640, and magnetic disk drive 651 and optical disk drive 655 are typically connected to the system bus 621 a data media interface that is optionally a removable memory interface. For purposes of explanation of the particular example, the magnetic disk drive 651 and the optical disk drive use the data media interface 640.

The drives and their associated computer storage media discussed above and illustrated in FIG. 6, provide storage of computer readable instructions, data structures, program modules and other data for the computer 610. In FIG. 6, for example, hard disk drive 641 is illustrated as storing operating system 644, application programs 645, other program modules 646, and program data 647. Note that these components can either be the same as or different from operating system 634, application programs 635, other program modules 636, and program data 637. Operating system 644, application programs 645, other program modules 646, and program data 647 are given different numbers here to illustrate that, at a minimum, they are different copies. A user may enter commands and information into the computer 610 through input devices such as a keyboard 662 and pointing device 661, commonly referred to as a mouse, trackball or touch pad. Other input devices (not shown) may include a microphone, joystick, game pad, satellite dish, scanner, or the like. These and other input devices are often connected to the processing unit 620 through a user input interface 660 that is coupled to the system bus 621, but may be connected by other interface and bus structures, such as a parallel port, game port or a universal serial bus (USB). A monitor 691 or other type of display device is also connected to the system bus 621 via an interface, such as a video interface 690. In addition to the monitor 691, computers may also include other peripheral output devices such as speakers and printer, which may be connected through a output peripheral interface 695.

The computer 610 may operate in a networked environment using logical connections to one or more remote computers, such as a remote computer 680. The remote computer 680 may be a personal computer, a server, a router, a network PC, a peer device or other common network node, and typically includes many or all of the features described above relative to the computer 610. The logical connections depicted in FIG. 6 include a local area network (LAN) 671 and a wide area network (WAN) 673, but may also include other networks. Such networking environments are commonplace in offices, enterprise-wide computer networks, intranets and the Internet.

When used in a LAN networking environment, the computer 610 is connected to the LAN 671 through a network interface or adapter 670. When used in a WAN networking environment, the computer 610 typically includes a modem 672 or other means for establishing communications over the WAN 673, such as the Internet. The modem 672, which may be internal or external, may be connected to the system bus 621 via the user input interface 660, or other appropriate mechanism. In a networked environment, program modules depicted relative to the computer 610, or portions thereof, may be stored in a remote memory storage device. By way of example, and not limitation, FIG. 6 illustrates remote application programs 685 as residing on the remote computer 680 (e.g., in memory of the remote computer 680). It will be appreciated that the network connections shown are exemplary and other means of establishing a communications link between the computers may be used.

Although various exemplary methods, devices, systems, etc., have been described in language specific to structural features and/or methodological acts, it is to be understood that the subject matter defined in the appended claims is not necessarily limited to the specific features or acts described. Rather, the specific features and acts are disclosed as exemplary forms of implementing the claimed subject matter.

The invention claimed is:

1. A computer-implementable method comprising:
  receiving, by a host computer, a call from a HTML application, the host computer having a collection of graphical user interfaces associated with a media platform operating system executable on the host computer, wherein the media platform comprises associated media categories and the call provides category information pertaining to one or more of the media categories; and
  in response to the call, registering the HTML application, according to the category information, wherein the registering comprises
    providing one or more entry points for the HTML application wherein each entry point corresponds to at least one of the media categories, the at least one media category determining one or more locations within at least one of the graphical user interfaces of the collection of graphical user interfaces where the entry points are to be placed, and wherein each entry point comprises one or more textual attributes specified within the call, the textual attributes defining a uniform resource locator of one of a plurality of pages of the HTML application; and
    adding information about the HTML application and the one or more entry points to a registry to thereby allow for use of the HTML application upon receipt of a command by the host computer, the command received during execution of the media platform operating system and during display of a graphical user interface having a correspondence to at least one of the one or more entry points.

2. The method of claim 1 wherein one of the graphical user interfaces of the collection of graphical user interfaces allows a user to unregister the application wherein unregistration removes all entry points for the HTML application.

3. The method of claim 1 wherein each entry point corresponds to a parameter for a globally unique identifier (GUID) of a graphical user interface of the collection of graphical user interfaces.

4. The method of claim 1 wherein an entry point corresponds to an item of a context menu.

5. The method of claim 4 wherein selection of the item launches the application.

6. The method of claim 1 wherein one of the entry points is placed in a new information graphical user interface that allows the HTML application to present new information, the new information graphical user interface being associated with a rule that allows only one entry point for each registered application to be placed in the new information graphical user interface.

7. A computer-implementable method comprising:
receiving a call from a HTML application registered on a host computer, the host computer having a collection of graphical user interfaces associated with a media platform operating system executing on the host computer wherein the media platform comprises associated media categories, wherein the registered HTML application comprises an entry point associated with one of the media categories, the media category determining one or more locations within one of the collection of graphical user interfaces where the entry point is to be placed, the entry point comprising one or more textual attributes, the textual attributes defining a uniform resource locator of a page of the registered HTML application; and
in response to the call, returning information to the registered HTML application indicating whether the registered HTML application is the current foreground application of the host computer or whether the registered HTML application has invoked currently playing media on the host computer.

8. The computer-implementable method of claim 7 wherein the indicating comprises providing a value that indicates either that the registered HTML application has the focus of the host computer or the registered HTML application invoked media currently playing on the host computer or that neither condition is true.

9. The computer-implementable method of claim 7 further comprising permitting or restricting an operation of the registered HTML application if the returned information indicates that the registered HTML application has the focus of the host computer or the registered HTML application invoked media currently playing on the host computer.

10. The computer-implementable method of claim 7 further comprising, in response to a call by the registered HTML application, indicating whether the registered HTML application is operating in a full screen mode or has invoked playing media in a full screen mode.

11. The computer-implementable method of claim 10 wherein the indicating whether the registered HTML application is operating in a full screen mode or has invoked playing media in a full screen mode comprises providing a value and using the value to indicate whether the registered HTML application can regain the focus of the host computer after conclusion of the currently playing media in the full screen mode.

12. A computer-readable storage medium storing computer-executable instructions configured to program a host computer to perform operations including:
receiving a call from a HTML application, the host computer having a collection of graphical user interfaces associated with a media platform operating system executable on the host computer, wherein the media platform comprises associated media categories and the call provides category information pertaining to one or more of the media categories; and
in response to the call, registering the HTML application, according to the category information, wherein the registering comprises
providing one or more entry points for the HTML application wherein each entry point corresponds to at least one of the media categories, wherein each entry point comprises one or more textual attributes specified within the call, the textual attributes defining a uniform resource locator of one of a plurality of pages of the HTML application; and
adding information about the HTML application and the one or more entry points to a registry to thereby allow for use of the HTML application upon receipt of a command by the host computer, the command received during execution of the media platform operating system and during display of a graphical user interface having a correspondence to at least one of the one or more entry points.

13. The computer-readable storage medium of claim 12 wherein one of the graphical user interfaces of the collection of graphical user interfaces allows a user to unregister the application wherein unregistration removes all entry points for the HTML application.

14. The computer-readable storage medium of claim 12 wherein each entry point corresponds to a parameter for a globally unique identifier (GUID) of a graphical user interface of the collection of graphical user interfaces.

15. The computer-readable storage medium of claim 12 wherein an entry point corresponds to an item of a context menu.

16. The computer-readable storage medium of claim 15 wherein selection of the item launches the application.

17. The computer-readable storage medium of claim 12 wherein one of the entry points is placed in a new information graphical user interface that allows the HTML application to present new information, the new information graphical user interface being associated with a rule that allows only one entry point for each registered application to be placed in the new information graphical user interface.

* * * * *